US 12,112,043 B2

(12) United States Patent
Lu et al.

(10) Patent No.: US 12,112,043 B2
(45) Date of Patent: Oct. 8, 2024

(54) DATA FLOW CONTROL DEVICE IN STREAMING ARCHITECTURE CHIP

(71) Applicant: Shenzhen Corerain Technologies Co., Ltd., Guangdong (CN)

(72) Inventors: Chenchen Lu, Guangdong (CN); Kuen Hung Tsoi, Guangdong (CN); Xinyu Niu, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 29 days.

(21) Appl. No.: 18/178,621

(22) Filed: Mar. 6, 2023

(65) Prior Publication Data
US 2023/0289065 A1    Sep. 14, 2023

(30) Foreign Application Priority Data

Mar. 11, 2022   (CN) .......................... 202210235740.8

(51) Int. Cl.
*G06F 3/06* (2006.01)
(52) U.S. Cl.
CPC ............ *G06F 3/0613* (2013.01); *G06F 3/064* (2013.01); *G06F 3/0656* (2013.01); *G06F 3/0673* (2013.01)

(58) Field of Classification Search
CPC ...... G06F 3/0613; G06F 3/064; G06F 3/0656; G06F 3/0673
See application file for complete search history.

(56) References Cited

U.S. PATENT DOCUMENTS

| 7,869,452 B1* | 1/2011 | Neuendorffer .......... G06F 30/34 370/416 |
| 2021/0373867 A1* | 12/2021 | Chen ....................... G06F 8/452 |

* cited by examiner

*Primary Examiner* — Edward J Dudek, Jr.

(57) ABSTRACT

A data flow control device in a streaming architecture chip includes at least one first data buffer module, at least one operation module and at least one second data buffer module. The second data buffer module is configured to send a flow control count signal to the first data buffer module, the flow control count signal being used for informing the first data buffer module of an amount of data that can be received of the second data buffer module. The first data buffer module is configured to send a data signal and a valid signal to the second data buffer module via the operation modules according to the flow control count signal, the valid signal being used for indicating that a corresponding data signal is valid.

9 Claims, 2 Drawing Sheets

DATA FLOW CONTROL DEVICE IN STREAMING ARCHITECTURE CHIP

CROSS REFERENCE TO RELATED APPLICATIONS

The present application claims the benefit of Chinese Patent Application No. 202210235740.8 filed on Mar. 11, 2022, the contents of which are incorporated herein by reference in their entirety.

TECHNICAL FIELD

The embodiments of the present disclosure relate to the technical field of data processing, and in particular, to a data flow control device in a streaming architecture chip.

BACKGROUND

The streaming architecture is a computer architecture that, in contrast to the traditional von Neumann architecture or the control flow architecture, does not have an instruction counter in concept, but uses a coarse-grained representation to improve data parallelism and allows the compiler to schedule multiple sequential loops and functions simultaneously to achieve higher throughput and lower latency. Currently, the streaming architecture has been successfully applied in dedicated hardware, such as digital signal processing, network routing, graphics processing, remote sensing, and database processing. At the same time, in many of today's software architectures (including database engine design and parallel computing frameworks), it also plays a very important role. Compared with the instruction set, the core of data flow is to enable efficient computation in every clock cycle such that data continuously flows into a computing unit for computation to obtain an output, and the final data will be stored in memory or flow into the next pipeline operation. In the streaming architecture, the control of computation is entirely relied on data flow, eliminating data overhead due to instruction control and data transfer, so that the streaming architecture may provide higher chip utilization for specific application scenarios.

In a streaming architecture chip, a large amount of data is first partitioned into several blocks, and then is moved and flows between different functional modules, and is computed in the functional modules. The partitioned data is transferred and processed between the modules like water flow, and therefore is referred to as data flow. The flow of the data from which functional module to which other functional module, and the speed of the data flow, need to be controlled, and such a control process is called data flow control. In the streaming architecture, data flow control is a very important part, which determines the efficiency of data transfer. Only when the efficiency of data transfer is high enough, can the efficiency of data processing be guaranteed. Otherwise, it may frequently occur that the data processing modules wait for the data.

Traditional data flow control is to use two handshake signals, i.e., valid and ready, for control between the upstream and downstream. Specifically, the downstream sets the ready signal to a high level when it is ready to receive data, and the upstream module may send data to the downstream upon reception of the ready signal, and pull the valid signal high every time when the data is sent to inform the downstream module that the data currently sent is valid. It is common to exchange information between upstream and downstream data processing modules through valid and ready handshake signals. However, when there are many modules connected in series in a system, and in order to ensure that the functional modules can work synchronously more efficiently, one ready signal is usually used to connect to many modules and drive many register circuits. Then, these modules under driving and corresponding circuits start working together when the downstream modules are ready, and pause together when the downstream modules are not ready. This causes a big problem that the ready signal is scattered too much, and the circuit routing is complicated, making the timing closure difficult.

SUMMARY

The embodiments of the present disclosure provide a data flow control device in a streaming architecture chip, in order to prevent the defects in data flow control using valid and ready handshake signals, and to solve the problem that the ready signal is scattered too much, making the timing closure difficult.

In a first aspect, an embodiment of the present disclosure provides a data flow control device in a streaming architecture chip. The device includes at least one first data buffer module, at least one operation module and at least one second data buffer module.

The second data buffer module is configured to send a flow control count signal to the first data buffer module, the flow control count signal being used for informing the first data buffer module of an amount of data that can be received of the second data buffer module.

The first data buffer module is configured to send a data signal and a valid signal to the second data buffer module via the operation modules in a first sequence according to the flow control count signal, the valid signal being used for indicating that a corresponding data signal is valid.

Optionally, the flow control count signal is a high-level signal, and each clock cycle that the high level of the flow control count signal lasts represents that one piece of data is receivable by the second data buffer module.

Optionally, the second data buffer module is specifically configured to send the flow control count signal to the first data buffer module via the operation modules in a second sequence.

Optionally, each of the first data buffer modules includes a first flow control counter, each of the second data buffer modules includes a second flow control counter, and each of the operation modules includes a third flow control counter and a fourth flow control counter; wherein,
  the first flow control counter is configured to calculate an amount of data that can be received that currently has been received by the first data buffer module;
  the second flow control counter is configured to calculate an amount of data that can be received that currently has been sent by the second data buffer module;
  the third flow control counter is configured to calculate an amount of data that can be received that currently has been received by each of the operation modules; and
  the fourth flow control counter is configured to simulate a change in the number of data between input and output of the corresponding operation module, so as to calculate an amount of data that can be received to be sent according to a received amount of data that can be received.

Optionally, each of the operation modules further includes a storage queue for buffering data, and a depth of the storage queue is greater than a sum of a delivery delay of the flow control count signal and a delivery delay of the data signal.

Optionally, if the operation modules include other operation modules besides an activation function module, the device further includes flow control count conversion modules in one-to-one correspondence with the other operation modules, and the flow control count conversion module is configured to simulate a change in the number of data between input and output of the corresponding operation module; and accordingly, the second data buffer module is specifically configured to send the flow control count signal to the first data buffer module via the flow control count conversion modules in a third sequence, and the flow control count conversion module is specifically configured to calculate an amount of data that can be received to be sent according to a received amount of data that can be received.

Optionally, if the operation module includes an activation function module only, the second data buffer module is specifically configured to directly send the flow control count signal to the first data buffer module.

Optionally, each of the first data buffer modules includes a first flow control counter, and each of the second data buffer modules includes a second flow control counter; the first flow control counter is configured to calculate an amount of data that can be received that currently has been received by the first data buffer module, and the second flow control counter is configured to calculate an amount of data that can be received that currently has been sent by the second data buffer module.

Optionally, the flow control count conversion module includes a first counter with an initial value being 0 and a second counter; wherein, the first counter is configured to calculate an amount of data that can be received that currently has been received by the corresponding flow control count conversion module, and to be incremented by 1 every time one amount of data that can be received is received; and the second counter is configured to calculate an amount of data that can be received that currently has been sent by the corresponding flow control count conversion module, and to be incremented by 1 every time one amount of data that can be received is sent when the first counter is not 0, and cleared by 0 when a first number of amounts of data that can be received have been sent, with the first counter being decremented by 1; wherein the first number is a ratio of change in the number of data between input and output of the corresponding operation module.

Optionally, the flow control count conversion module is specifically configured to suspend sending out an amount of data that can be received if the first counter is not greater than 0.

The embodiments of the present disclosure provide a data flow control device in a streaming architecture chip, and the device includes at least one first data buffer module, at least one operation module and at least one second data buffer module. The downstream second data buffer module may send a flow control count signal to the first data buffer module when it is ready to receive data, so as to inform the first data buffer module of an amount of data that can be received of the second data buffer module, so that the first data buffer module knows how much data needs to be sent. Then, the first data buffer module may send a data signal and a valid signal to the second data buffer module via the operation modules in a certain sequence according to the received flow control count signal, wherein the valid signal may indicate that the data in the corresponding timing sequence is valid. According to the data flow control device in the streaming architecture chip provided in the embodiments of the present disclosure, by using the flow control count signal for data flow control, the problem in the related art that the signal is scattered too much, making the timing closure difficult is prevented while ensuring the high efficiency of data flow, so that physical implementations of circuit layout and routing of the chip, timing closure, etc., are facilitated, and the number of optimization iterations of the physical implementation process of the chip is reduced.

DETAILED DESCRIPTION OF THE INVENTION

Figure 1:
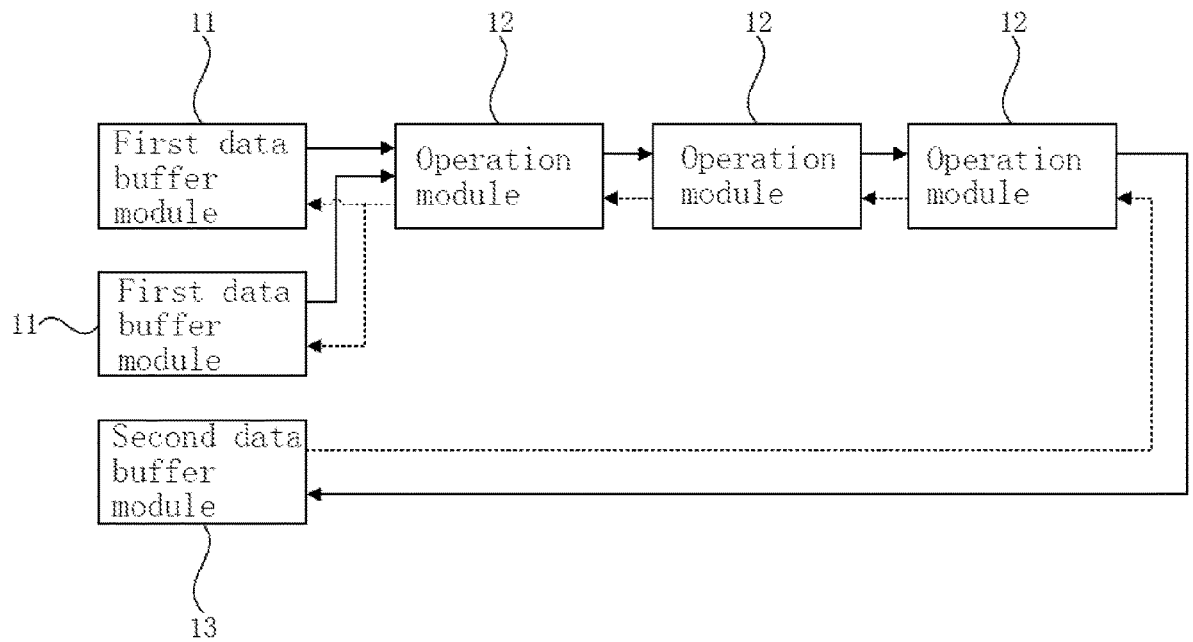
FIG. 1 is a schematic structural diagram of a data flow control device in a data flow architecture chip provided in Embodiment 1 of the present disclosure.

The present disclosure will be further described in detail with reference to the accompanying drawings and embodiments. It should be understood that the particular embodiments described herein are intended merely to explain the present disclosure and are not intended to limit it. It should also be noted that, for the convenience of description, merely parts, but not all, of the structures related to the present disclosure are shown in the drawings.

Before discussing the exemplary embodiments in more detail, it should be noted that some exemplary embodiments are described as processes or methods depicted as flowcharts. Although the flowchart depicts the steps as sequential processes, many of the steps may be implemented in parallel, concurrently or simultaneously. Furthermore, the order of the steps may be rearranged. The process may be terminated when its operations are completed, but there also may be additional steps not included in the drawings. The process may correspond to a method, a function, a procedure, a subroutine, a subprogram, etc.

Furthermore, the terms "first", "second", etc. may be used herein to describe various directions, actions, steps, or elements, etc., but such directions, actions, steps, or elements are not limited by such terms. These terms are merely used to distinguish a first direction, action, step or element from another. For example, without departing from the scope of the present application, a first operation module may be referred to as a second operation module, and similarly, a second operation module may be referred to as a first operation module. Both the first operation module and the second operation module are operation modules, but they are not the same. The terms "first", "second", etc. are not to be construed as indicating or implying relative importance or implicitly indicating the number of the indicated technical features. Thus, the features defined as "first", "second", etc. may explicitly or implicitly include one or more of the features. In the description of the present disclosure, "plurality" means at least two, e.g., two, three, etc., unless specifically defined otherwise.

Embodiment 1

FIG. 1 is a schematic structural diagram of a data flow control device in a streaming architecture chip provided in Embodiment 1 of the present disclosure, and the present embodiment may be applied to the case of performing data flow control in a streaming architecture chip. As shown in FIG. 1, the device includes at least one first data buffer module 11 (shown as including two first data buffer modules 11 in FIG. 1), at least one operation module 12 (shown as including three operation modules 12 in FIG. 1), and at least one second data buffer module 13 (shown as including one second data buffer module 13 in FIG. 1). The second data buffer module 13 is configured to send a flow control count signal to the first data buffer module 11, the flow control count signal being used for informing the first data buffer module 11 of an amount of data that can be received of the second data buffer module 13. The first data buffer module 11 is configured to send a data signal and a valid signal to the second data buffer module 13 via the operation modules 12 in a first sequence according to the flow control count signal, the valid signal being used for indicating that the corresponding data signal is valid.

Specifically, based on the direction of data transfer, there is a group of data signals and one valid signal between the upstream modules and the downstream modules, for example, between a certain first data buffer module 11 and a first operation module 12, and between a first operation module 12 and a second operation module 12, etc., until a certain second data buffer module 13 is connected, which are shown by solid lines in FIG. 1, indicating that the upstream modules transmit data signals and valid signals to the downstream modules. Specifically, when the valid signal is at a high level, it represents that the data is valid, and when the valid signal is at a low level, it represents that the data is invalid. Therefore, whenever an upstream module needs to send data to a downstream module, a corresponding valid signal may be pulled high so as to inform the downstream module that the data currently sent is valid. The first sequence is a sequence in which the data is processed via the operation modules 12 in turn according to needs.

Meanwhile, the downstream module may connect a flow control count signal (credit signal) to the upstream module, and the signal may inform the upstream module how much data the downstream module may receive. Specifically, starting from the second data buffer module 13, the amount of data that can be received of the second data buffer module 13 is transferred forward, and according to a change in the number of data between input and output of each operation module 12, the amount of data that can be sent by the final first data buffer module 11 may be determined, that is, the flow control count signal sent by the second data buffer module 13 is adjusted correspondingly through the operation modules 12, so that the first data buffer module 11 may determine how much data needs to be sent according to the received flow control count signal, and may correspondingly generate a data signal and a valid signal. In a convolution neural network chip of the streaming architecture, based on the direction of data transfer, the operation module 12 specifically may include, in sequence, a convolution operation module, an activation function module, a pooling operation module, and other operation modules.

Optionally, the flow control count signal is a high-level signal, and each clock cycle of the flow control count signal being at a high level represents that one piece of data is receivable by the second data buffer module 13. Specifically, in a default state, the flow control count signal may be at a low level, and when the flow control count signal is at a high level, every clock cycle that the high level lasts may represent that one piece of data is receivable by the second data buffer module 13. For example, if the high level of the flow control count signal lasts for three clock cycles, it may represent that the second data buffer module 13 may receive three pieces of data, and at the same time, it may represent that the upstream module may send three pieces of data. In this way, it eliminates the need to detect the ready signal in real time when the upstream module is sending data, and prevents the ready signal from being connected to many register circuits.

On this basis, optionally, the second data buffer module 13 is specifically configured to send the flow control count signal to the first data buffer module 11 via the operation modules 12 in a second sequence. Specifically, the transfer of the flow control count signal may be directly achieved through the operation modules 12 themselves, which may be specifically implemented by adding various functional units within the original operation modules 12. The second sequence is a reverse sequence of the sequence in which the data passes through the operation modules 12 in sequence for processing according to needs.

Figure 2:
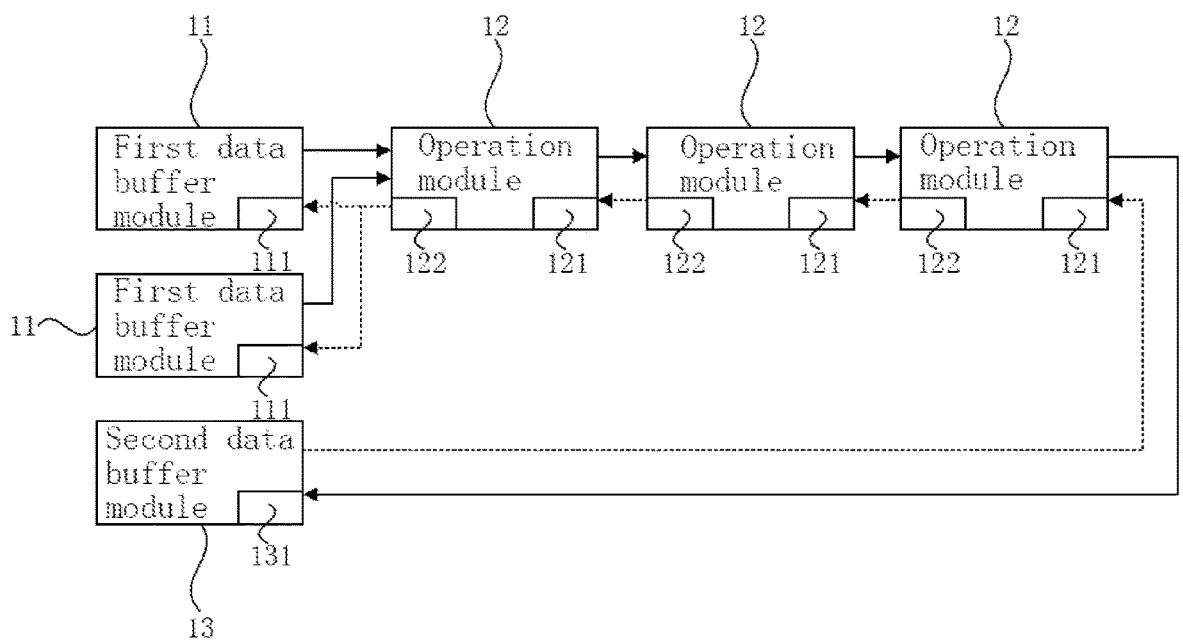
FIG. 2 is an another schematic structural diagram of a data flow control device in a streaming architecture chip provided in Embodiment 1 of the present disclosure.

Furthermore, optionally, as shown in FIG. 2, each of the first data buffer modules 11 includes a first flow control counter 111, each of the second data buffer modules 13 includes a second flow control counter 131, and each of the operation modules 12 includes a third flow control counter 121 and a fourth flow control counter 122. The first flow control counter 111 is configured to calculate an amount of data that can be received that currently has been received by the first data buffer module 11; the second flow control counter 131 is configured to calculate an amount of data that can be received that currently has been sent by the second data buffer module 13; the third flow control counter 121 is configured to calculate an amount of data that can be received that currently has been received by each of the current operation modules 12; and the fourth flow control counter 122 is configured to simulate a change in the number of data between input and output of the corresponding operation module 12, so as to calculate an amount of data that can be received to be sent according to a received amount of data that can be received. Specifically, the transfer of the flow control count signal may be achieved by setting a flow control counter in each module, and specifically, a second flow control counter 131 may be provided in the second data buffer module 13 to calculate the amount of data that can be received that currently has been sent by the second data buffer module 13 (for example, the number of clock cycles of a high-level signal that has been sent), so that it may be determined how much data the second data buffer module 13 may receive, and then continue to send the flow control count signal to the upstream module. A first control counter 111 may be provided in the first data buffer module 11 to calculate an amount of data that can be received that currently has been received by the first data buffer module 11 (for example, the number of clock cycle of a high-level signal that has been received), so that the amount of data that can be sent by the first data buffer module 11 may be determined, and a corresponding data signal and a valid signal are generated to a downstream module. A third flow control counter 121 and a fourth flow control counter 122 may be provided in the operation module 12, and an amount of data that can be received that currently has been received (for example, the number of clock cycles of a high-level signal that has been received) by the corresponding operation module 12 is calculated by the third flow control counter 121, and then an amount of data that can be received to be sent (for example, the number of clock cycles of a high-level signal to be sent) is calculated by the fourth flow control counter 122 by simulating a change in the number of data between input and output of the corresponding operation module 12, so that the flow control count signal is transferred from the second data buffer module 13 to the first data buffer module 11 via the operation modules 12, and the first data buffer module 11 may determine an amount of data that it can send according to the finally received flow control count signal.

Furthermore, optionally, each of the operation modules 12 further includes a storage queue for buffering data, and a depth of the storage queue is greater than a sum of a delivery delay of the flow control count signal and a delivery delay of the data signal. Specifically, in order to prevent performance losses such as data flow interruption caused by the delivery delay of the flow control count signal and the delivery delay of the data signal, a storage queue (specifically a FIFO queue) with a sufficient depth may be used in the downstream data receiving modules to buffer the received data. Besides, in a convolution neural network chip of the streaming architecture, the data buffer module (buffer) has a storage space much larger than that in the operation module, and also serves to buffer data, therefore, the downstream data receiving modules herein may only include the operation modules 12, and there is no need to add a storage queue in the first data buffer module 11 and the second data buffer module 13.

Figure 3:
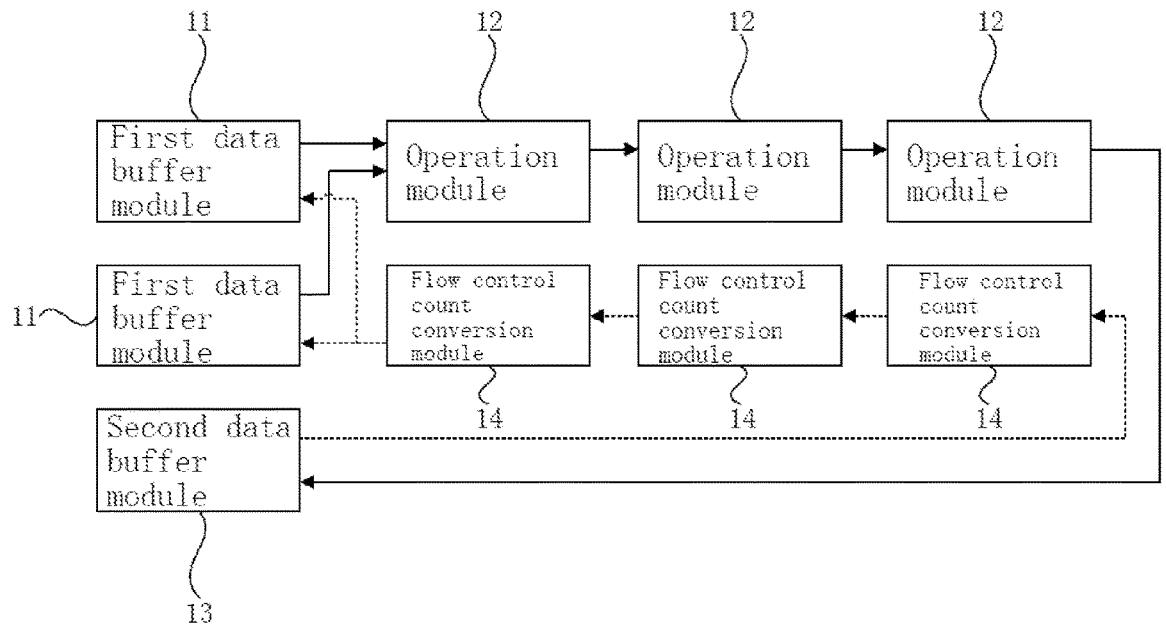
FIG. 3 is an another schematic structural diagram of a data flow control device in a streaming architecture chip provided in Embodiment 1 of the present disclosure.

On the basis of the above technical scheme, optionally, as shown in FIG. 3, if the operation module 12 includes other operation modules besides an activation function module (as shown in FIG. 3, with an activation function module not included as an example), the device further includes flow control count conversion modules 14 in one-to-one correspondence with the other operation modules, and the flow control count conversion module 14 is configured to simulate a change in the number of data between input and output of the corresponding operation module 12. Accordingly, the second data buffer module 13 is specifically configured to send the flow control count signal to the first data buffer module 11 via the flow control count conversion modules 14 in a third sequence, and the flow control count conversion module 14 is specifically configured to calculate an amount of data that can be received to be sent according to a received amount of data that can be received. Specifically, in a convolution neural network chip of the streaming architecture, there are usually three or more buffers for buffering data (which may be used as the first data buffer module 11 and the second data buffer module 13) and some convolution neural network operation modules (which may be used as the operation modules 12), and the storage space of the buffer is much larger than that in other convolution neural network operation modules. At the same time, the above-mentioned method of directly transferring the flow control count signal through the operation modules 12 increases the area of circuit, and involves changes to every module, resulting in an excessive amount of change. By careful analysis of the architecture, it is found that if the second data buffer module 13 does not generate a data back-pressure, the operation modules 12 also do not generate a data back-pressure, that is, if the storage space of the second data buffer module 13 is large enough, the first data buffer module 11 may send data all the time, and the operation modules 12 may also perform operations all the time. Therefore, the flow control count conversion module 14 may be added only outside the operation modules 12 to simulate a change in the number of data between input and output of each operation module 12, without adding any flow control correlation unit inside each operation module 12. Specifically, the flow control count conversion module 14 may receive the flow control count signal sent by the second data buffer module 13, determines a received amount of data that can be received (for example, the number of clock cycles of a high-level signal received), and then simulate a change in the number of data between input and output of the corresponding operation module 12 to calculate an amount of data that can be received to be sent (for example, the number of clock cycles of a high-level signal to be sent), so that the flow control count signal is transferred from the second data buffer module 13 to the first data buffer module 11 through the flow control count conversion modules 14, and the first data buffer module 11 determines an amount of data that can be sent according to the flow control count signal finally received. In a streaming architecture chip, the flow control count conversion module 14 is configured to simulate a change in the number of data between input and output of each operation module 12. For example, for the convolution operation module, after one convolution box of data is input, assuming that an output of one piece of data is generated when the number of data of the convolution box is N, then the function of the flow control count conversion module 14 corresponding to the convolution operation module is to continue to send a high-level signal of N clock cycles to the first data buffer module 11 every time a high-level signal of one clock cycle is received. In addition, for the activation function module, an output of one piece of data is generated every time one piece of data is input, and the number of input data is identical to that of output data, there is no need for flow control count conversion, and also there is no need to add a corresponding flow control count conversion module 14. That is, if the operation module 12 includes the activation function module, the flow control count signal sent by the downstream module or the flow control count conversion module 14 corresponding to the downstream module may be directly transferred to the upstream module or the flow control count conversion module 14 corresponding to the upstream module. The third sequence may be a sequence of the flow control count conversion modules 14 corresponding to the second sequence (except for the activation function module).

Furthermore, optionally, if the operation module 12 includes an activation function module only, the second data buffer module 13 is specifically configured to directly send the flow control count signal to the first data buffer module 11. Specifically, as stated above, the activation function module does not need to be added with a corresponding flow control count conversion module; therefore, if the operation module 12 includes the activation function module only, the second data buffer module 13 may directly send the flow control count signal to the first data buffer module 11.

Figure 4:
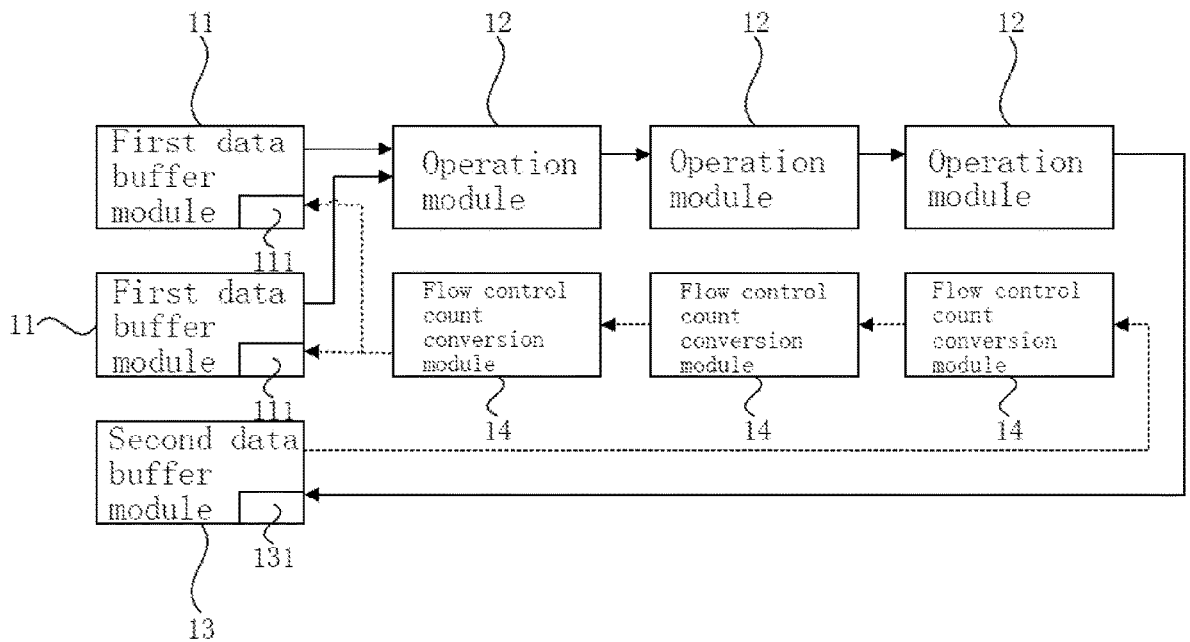
FIG. 4 is an another schematic structural diagram of a data flow control device in a streaming architecture chip provided in Embodiment 1 of the present disclosure.

Furthermore, optionally, as shown in FIG. 4, each of the first data buffer modules 11 includes a first flow control counter 111, and each of the second data buffer modules 13 includes a second flow control counter 131; the first flow control counter 111 is configured to calculate an amount of data that can be received that currently has been received by the first data buffer module 11, and the second flow control counter 131 is configured to calculate an amount of data that can be received that currently has been sent by the second data buffer module 13. Specifically, the second flow control counter 131 may be provided in the second data buffer module 13 to calculate the amount of data that can be received that currently has been sent by the second data buffer module 13 (for example, the number of the clock cycles of a high-level signal that has been sent), so as to determine how much data the second data buffer module 13 may receive, and then continue to send a flow control count signal to the upstream module. The first control counter 111 may be provided in the first data buffer module 11 to calculate an amount of data that can be received that currently has been received by the first data buffer module 11 (for example, the number of clock cycles of a high-level signal that has been received), so as to determine an amount of data that the first data buffer module 11 can send, and generate a corresponding data signal and a valid signal to the downstream module. By using the flow control count conversion modules to transfer the flow control count signal, and adding relevant flow control units in the first data buffer module 11 and the second data buffer module 13, the storage information of the second data buffer module 13 may be accurately and timely transferred to the upstream first data buffer module 11, and the first data buffer module 11 may also accurately know how much data needs to be transferred to the downstream operation modules 12 before transferring data, causing no data transfer errors (e.g. too much data is transferred to cause data coverage), and ensuring efficient data transfer. Furthermore, there is no need to add a storage queue for flow control in the first data buffer module 11 and the second data buffer module 13, because the first data buffer module 11 and the second data buffer module 13 also serve to buffer data and have the same function, thus preventing the increase of circuit area, that is, using the storage units in the streaming architecture chip as starting and ending points of data flow control, so that the storage units are fully utilized for buffering data, reducing nodes in flow control, and preventing consumption of more storage resources and increase of design complexity by using the above-mentioned flow control method.

Furthermore, optionally, the flow control count conversion module 14 includes a first counter with an initial value being 0 and a second counter. The first counter is configured to calculate an amount of data that can be received that currently has been received by the corresponding flow control count conversion module 14, and to be incremented by 1 every time one receivable amount of data that can be received is received; the second counter is configured to calculate an amount of data that can be received that currently has been sent by the corresponding flow control count conversion module 14, and to be incremented by 1 every time one amount of data that can be received is sent when the first counter is not 0, and cleared by 0 when a first number of amounts of data that can be received have been sent, with the first counter being decremented by 1; wherein the first number is a ratio of change in the number of data between input and output of the corresponding operation module 12. Specifically, for each flow control count conversion module 14, the first counter may be incremented therein by 1 every time a high-level signal of one clock cycle is received, and correspondingly, the first counter is decremented by 1 every time a high-level signal of N clock cycles is sent, so that an amount of data that can be sent by the flow control count conversion module 14 may be determined according to the value of the first counter, wherein N is the first number. Accordingly, for each flow control count conversion module 14, the second counter is configured to count N. When the first counter is not 0, the second counter is incremented by 1 every time a high-level signal of one clock cycle is sent; and after a high-level signal of N clock cycles has been sent, the second counter is cleared, and then it may be determined whether the first counter is greater than 0, if the first counter is greater than 0, a high-level signal of N clock cycles may be sent again, so that a high-level signal of N clock cycles may be sent out every time high-level signal of one clock cycle is received through the first counter and the second counter, thereby simulating a change in the number of data between input and output of the corresponding to the operation module 12. Of course, the above-mentioned scheme is applicable to the case that a ratio of change in the number of data between input and output is N to 1, where N is a positive integer, while the cases that a ratio of change in the number of data between input and output 1 to N, N to M, etc., may also be taken into account, and the counting methods of the first counter and the second counter may be correspondingly adjusted, which is not repeated here.

Furthermore, optionally, the flow control count conversion module is specifically configured to suspend sending out the amount of data that can be received if the first counter is not greater than 0, that is, the sending of the flow control count signal may also be controlled by the value of the first counter, so as to ensure the accuracy of the amount of data that can be received finally received by the first data buffer module 11.

The embodiments of the present disclosure provide a data flow control device in a streaming architecture chip, and the device includes at least one first data buffer module, at least one operation module and at least one second data buffer module. The downstream second data buffer module may send a flow control count signal to the first data buffer module when it is ready to receive data, so as to inform the first data buffer module of an amount of data that can be received of the second data buffer module, so that the first data buffer module knows how much data needs to be sent. Then, the first data buffer module may send a data signal and a valid signal to the second data buffer module via the operation modules in a certain sequence according to the received flow control count signal, wherein the valid signal may indicate that the data in the corresponding timing sequence is valid. By using the flow control count signal for data flow control, the problem that the ready signal is scattered too much, making the timing closure difficult is prevented while ensuring the high efficiency of data flow, so that physical implementations of circuit layout and routing of the chip, timing closure, etc., are facilitated, and the number of optimization iterations of the physical implementation process of the chip is reduced.

It should be noted that the above description is merely a preferred embodiment of the present disclosure and the technical principles applied thereto. It will be understood by those skilled in the art that the present disclosure is not limited to the particular embodiment described herein, and that various obvious changes, rearrangements and substitutions may be made by those skilled in the art without departing from the scope of the present disclosure. Therefore, although the present disclosure has been described in detail with reference to the above embodiments, the present disclosure is not limited to the above embodiments, but it may cover more other equivalent embodiments without departing from the concept of the present disclosure, the scope of which is defined by the scope of the appended claims.

The invention claimed is:

1. A data flow control device in a streaming architecture chip, comprising:

at least one first data buffer module, at least one operation module, and at least one second data buffer module; wherein the second data buffer module is configured to send a flow control count signal to the first data buffer module, the flow control count signal being used for informing the first data buffer module of an amount of data that can be received of the second data buffer module; and the first data buffer module is configured to send a data signal and a valid signal to the second data buffer module via the operation modules in a first sequence according to the flow control count signal, the valid signal being used for indicating that the corresponding data signal is valid, wherein the flow control count signal is a high-level signal, and each clock cycle that the high level of the flow control count signal lasts represents that one piece of data is receivable by the second data buffer module.

2. The data flow control device in the streaming architecture chip according to claim 1, wherein the second data buffer module is specifically configured to send the flow control count signal to the first data buffer module via the operation modules in a second sequence.

3. The data flow control device in the streaming architecture chip according to claim 2, wherein each of the first data buffer modules comprises a first flow control counter, each of the second data buffer modules comprises a second flow control counter, and each of the operation modules comprises a third flow control counter and a fourth flow control counter; wherein the first flow control counter is configured to calculate an amount of data that can be received that currently has been received by the first data buffer module;

the second flow control counter is configured to calculate an amount of data that can be received that currently has been sent by the second data buffer module;

the third flow control counter is configured to calculate an amount of data that can be received that currently has been received by each of the operation modules; and the fourth flow control counter is configured to simulate a change in the number of data between input and output of the corresponding operation module, so as to calculate an amount of data that can be received to be sent according to a received amount of data that can be received.

4. The data flow control device in the streaming architecture chip according to claim 3, wherein each of the operation modules further comprises a storage queue for buffering data, and a depth of the storage queue is greater than a sum of a delivery delay of the flow control count signal and a delivery delay of the data signal.

5. The data flow control device in the streaming architecture chip according to claim 1, wherein if the operation modules include other operation modules besides an activation function module, the device further comprises flow control count conversion modules in one-to-one correspondence with the other operation modules, and the flow control count conversion module is configured to simulate a change in the number of data between input and output of the corresponding operation module; and accordingly, the second data buffer module is specifically configured to send the flow control count signal to the first data buffer module via the flow control count conversion modules in a third sequence, and the flow control count conversion module is specifically configured to calculate an amount of data that can be received to be sent according to a received amount of data that can be received.

6. The data flow control device in the streaming architecture chip according to claim 1, wherein if the operation module includes an activation function module only, the second data buffer module is specifically configured to directly send the flow control count signal to the first data buffer module.

7. The data flow control device in a streaming architecture chip according to claim 5, wherein each of the first data buffer modules comprises a first flow control counter, and each of the second data buffer modules comprises a second flow control counter; the first flow control counter is configured to calculate an amount of data that can be received that currently has been received by the first data buffer module, and the second flow control counter is configured to calculate an amount of data that can be received that currently has been sent by the second data buffer module.

8. The data flow control device in a streaming architecture chip according to claim 5, wherein the flow control count conversion module comprises a first counter with an initial value being 0 and a second counter; wherein the first counter is configured to calculate an amount of data that can be received that currently has been received by the corresponding flow control count conversion module, and to be incremented by 1 every time one amount of data that can be received is received; and the second counter is configured to calculate an amount of data that can be received that currently has been sent by the corresponding flow control count conversion module, and to be incremented by 1 every time one amount of data that can be received is sent when the first counter is not 0, and cleared by 0 when a first number of amounts of data that can be received have been sent, with the first counter being decremented by 1; wherein the first number is a ratio of change in the number of data between input and output of the corresponding operation module.

9. The data flow control device in the streaming architecture chip according to claim 8, wherein the flow control count conversion module is specifically configured to suspend sending out an amount of data that can be received if the first counter is not greater than 0.

* * * * *